Dec. 28, 1948. J. H. FLAUGHER 2,457,358
SINKER FOR DEEP SEA AND BEACH FISHING
Filed Dec. 27, 1943
Fig. 1.
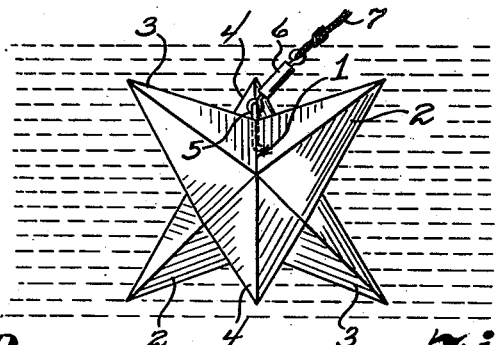
Fig. 2.  Fig. 3.
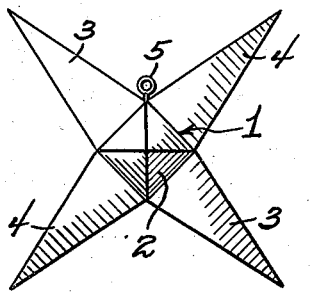 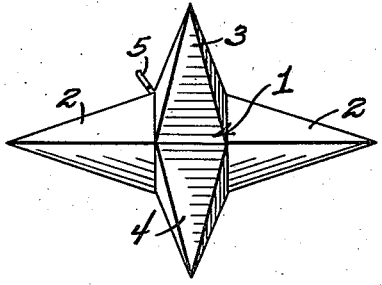
Fig. 4.
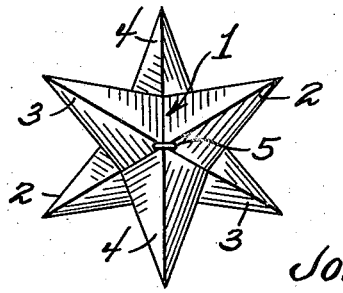
John Harry Flaugher
INVENTOR.
BY
Victor J. Evans & Co.
ATTORNEYS Patented Dec. 28, 1948

2,457,358

UNITED STATES PATENT OFFICE 2,457,358

SINKER FOR DEEP-SEA AND BEACH FISHING

John Harry Flaugher, Tiffin, Ohio

Application December 27, 1943, Serial No. 515,767

4 Claims. (Cl. 43—52)

This invention relates to fishing sinkers and it is one object to provide a sinker which is particularly adapted for use when surf fishing and it is desired to provide the line with a sinker which will firmly anchor itself in sand along a beach and not be washed towards or away from the beach by breakers or undertow.

Another object of the invention is to provide a sinker having radiating arms of such formation that when a cast is made the arms will embed themselves in mud or sand and serve very effectively to prevent breakers or undertow from moving the sinker along the beach.

Another object of the invention is to so form the improved sinker that when it is attached to a fishing line, the line may be cast in the usual manner for beach or deepsea fishing and remain in the position in which it is cast until the line is intentionally reeled in.

The invention is illustrated in the accompanying drawings wherein:

Figure 1 is a perspective view of the improved sinker.

Figure 2 is a view looking at the sinker from one end.

Figure 3 is a side view of the sinker.

Figure 4 is a view looking down upon the sinker.

This improved sinker may be formed of lead or other suitable metal or alloy having sufficient weight to serve the purpose. The sinker is solid and has a body 1 and arms 2, 3 and 4 which extend from the body in radiating relation thereto. Attention is called to the fact that the arms 2 are disposed in opposed longitudinal alignment with each other, the arms 3 in opposed alignment with each other at right angles to arms 2, and the arms 4 in opposed alignment with each other and at right angles to both the arms 2 and the arms 3. While the sinker has been shown provided with six arms it is to be understood that as many as desired may be provided, the said arms being arranged in pairs disposed in radiating relation to the body and in opposed alignment with each other. The arms taper to points at their outer ends and have flat side faces which are smooth and unobstructed and along intersections of their side faces the arms are formed with side edges which are sufficiently sharp to permit the arms to readily embed themselves in sand, mud, clay, or similar sea bottom. An eye 5 is carried by the body between bases of certain of the arms and projects radially from the body, the eye being of such length that a swivel 6 may be easily applied to the eye and a fishing line 7 tied to the outer end of the swivel.

When this sinker is in use the fishing line 7 is tied through the outer end of the swivel 6 and the line cast in the usual manner. After the line reaches the extent of the cast the sinker enters the water and its weight carries it to the bottom where certain of its arms will embed themselves in the sand or other sea bottom. If the arms do not immediately embed themselves in the bottom the sinker will only be turned a few times or shifted a very short distance along the bottom before the arms embed themselves and hold the sinker stationary. When the sinker is so anchored breakers or undertow cannot shift it and it will remain in the location in which it is cast. When a fish is caught and the line reeled in the sinker will break loose from the sand and not interfere with reeling in of the line. As the weight is evenly distributed throughout the sinker the line may be very easily and very accurately cast.

Having thus described the invention, what is claimed is:

1. A fishing line sinker comprising a body formed of heavy metal and having radiating pyramidal shaped arms tapered to points at their outer ends and having flat side faces intersecting to form sharp side edges for the arms, said arms being arranged in pairs, the arms of each pair being disposed in longitudinal alignment with each other and at right angles to the other pairs of arms, and an eye carried by said body and projecting therefrom between bases of certain of said arms.

2. A fishing sinker comprising a body having pyramidal shaped arms radiating therefrom and arranged in pairs, the arms of each pair being in longitudinal alignment with each other and tapered to points at their outer ends, and means carried by said body between bases of certain of the arms for connecting a fishing line with the sinker.

3. A fishing line sinker, comprising a body formed of heavy metal and having radiating pyramidal shaped arms tapered to points at their outer ends and flat side faces to form sharp edges between certain of the sides, and an eye carried by said body.

4. A fishing line sinker, comprising a body formed of heavy metal and having oppositely arranged radiating pyramidal shaped arms tapered to points at their outer ends and flat side faces on one side to form sharp edges between certain of the side faces, and an eye carried by said body above and in a plane passed through two opposed points.

JOHN HARRY FLAUGHER.

REFERENCES CITED

The following references are of record in the file of this patent:

UNITED STATES PATENTS

| Number | Name | Date |
|---|---|---|
| 762,439 | Reddish | June 14, 1904 |
| 1,051,334 | Johnston | Jan. 21, 1918 |
| 1,127,747 | Fackenthall | Feb. 9, 1915 |
| 1,356,481 | Windle | Oct. 19, 1920 |
| 2,237,540 | Asprer | Apr. 8, 1941 |